(12) United States Patent
Skowronski

(10) Patent No.: US 10,798,444 B2
(45) Date of Patent: Oct. 6, 2020

(54) METHOD AND SYSTEM FOR CHANNEL NAVIGATION AND PREDICTIVE TUNING IN A CONTENT RECEIVER

(71) Applicant: ADVANCED DIGITAL BROADCAST S. A., Eysins (CH)

(72) Inventor: Zbigniew Skowronski, Zielona Gora (PL)

(73) Assignee: ADVANCED DIGITAL BROADCAST S. A., Bellevue (CH)

( * ) Notice: Subject to any disclaimer, the term of this patent is extended or adjusted under 35 U.S.C. 154(b) by 0 days.

(21) Appl. No.: 16/387,595

(22) Filed: Apr. 18, 2019

(65) Prior Publication Data

US 2019/0327517 A1 Oct. 24, 2019

(30) Foreign Application Priority Data

Apr. 24, 2018 (EP) ..................................... 18168940

(51) Int. Cl.
| | | |
|---|---|---|
| *H04N 21/438* | (2011.01) | |
| *H04N 21/422* | (2011.01) | |
| *H04N 21/433* | (2011.01) | |
| *H04N 21/45* | (2011.01) | |
| *H04N 21/482* | (2011.01) | |

(52) U.S. Cl.
CPC ... *H04N 21/4383* (2013.01); *H04N 21/42204* (2013.01); *H04N 21/433* (2013.01); *H04N 21/4532* (2013.01); *H04N 21/4821* (2013.01)

(58) Field of Classification Search
CPC ......... H04N 21/4383; H04N 21/42204; H04N 21/433; H04N 21/4532; H04N 21/4821
See application file for complete search history.

(56) References Cited

U.S. PATENT DOCUMENTS

| | | | | |
|---|---|---|---|---|
| 6,198,513 | B1* | 3/2001 | Cherrick | H04N 5/44513 348/731 |
| 8,533,760 | B1* | 9/2013 | Lakin | H04N 21/4384 348/38 |
| 2003/0226153 | A1 | 12/2003 | Bessel et al. | |
| 2006/0085828 | A1 | 4/2006 | Dureau et al. | |
| 2006/0277582 | A1 | 12/2006 | Kiiskinen et al. | |

(Continued)

FOREIGN PATENT DOCUMENTS

EP 2750398 A1 7/2014

*Primary Examiner* — Chenea Davis
(74) *Attorney, Agent, or Firm* — Mark M. Friedman

(57) ABSTRACT

A computer-implemented method for navigating through channels in a content receiver, wherein the channels have assigned channel numbers and categories, the method comprising: providing a list of categories; providing an ordered list of channels for each category; upon receiving a channel zapping command (SIMILAR+, SIMILAR−), selecting a next channel or a previous channel from the list of channels for the current category; upon receiving a category zapping command (NEXT, PREV), selecting a last watched channel in a next category or a previous category from the list of categories and changing the current category to the next category or the previous category; storing the channel number of the selected channel as the last watched channel on the current channel category; and tuning the content receiver to the selected channel. A suitable predictive channels assignment to respective tuners is also disclosed.

11 Claims, 13 Drawing Sheets

(56) References Cited

U.S. PATENT DOCUMENTS

| | | |
|---|---|---|
| 2009/0002570 A1* | 1/2009 | Oki ................. H04N 5/4401 |
| | | 348/726 |
| 2011/0134322 A1 | 6/2011 | Wills |
| 2011/0234915 A1 | 9/2011 | Yamada |
| 2012/0266188 A1* | 10/2012 | Ryu ............. H04N 21/42204 |
| | | 725/25 |
| 2014/0198254 A1 | 7/2014 | Boss |

* cited by examiner

METHOD AND SYSTEM FOR CHANNEL NAVIGATION AND PREDICTIVE TUNING IN A CONTENT RECEIVER

TECHNICAL FIELD

The present disclosure relates to a method and system for navigating through channels in a content receiver. In particular, the present invention focuses on navigation combined with appropriate assignment of available tuners.

BACKGROUND

Customer devices (such as digital television Set Top Boxes, STBs) offer several possibilities of receiving downstream data, such as video content, from various sources, such as a broadcasting distribution network (satellite, cable, terrestrial), the Internet (OTT, VOD) etc. An increasing amount of available channels, programs, OTT and VOD assets make it difficult to browse through the currently available content and to find a desired channel or program during a reasonable time. It may happen that the user is discouraged from looking for (zapping) a possibly more interesting channels/programs due to a burdensome process of browsing.

Therefore there is a need to provide a method and a system which would provide an easy and convenient way for navigating through channels in a content receiver.

SUMMARY

A computer-implemented method for navigating through channels in a content receiver, wherein the channels have assigned channel numbers and categories, the method comprising: providing a list of categories; providing an ordered list of channels for each category; upon receiving a channel zapping command, selecting a next channel or a previous channel from the list of channels for the current category; upon receiving a category zapping command, selecting a last watched channel in a next category or a previous category from the list of categories and changing the current category to the next category or the previous category; storing the channel number of the selected channel as the last watched channel on the current channel category; tuning the content receiver to the selected channel.

Further, said method comprises: executing, in a loop, channel prediction comprising the following steps: awaiting for a channel category change or channel change request; storing a time of the request; determining a direction of the request wherein said directions are selected from a group comprising: a next channel, a previous channel, a next category, a previous category; verifying whether the stored time is within a threshold to the previous category or channel change and in case it is: reading current predictive channel tuning assignment and increasing the number of tuners in the determined direction while decreasing the number of tuners in the direction identified by the system preferences; storing current predictive channel tuning assignment; tuning the free tuners to channel(s) according to modified tuners assignment; returning to the beginning of said loop.

BRIEF DESCRIPTION OF DRAWINGS

The method presented herein is presented by means of example embodiments on a drawing, wherein.

Notation and Nomenclature

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

In the present disclosure, the term "video content" is to be understood more broadly as multimedia content comprising video data and associated audio data and associated additional data (such as content description, etc.). The term "video content" is used to distinguish the content from other content types, such as still images or raw data (e.g. files).

DETAILED DESCRIPTION

The system and method will be presented below with reference to an embodiment related to a television Set Top Box (STB). However, it may be implemented in an equivalent manner to other content receiving devices, such as personal computers, portable devices, smartphones, etc.

Figure 1:
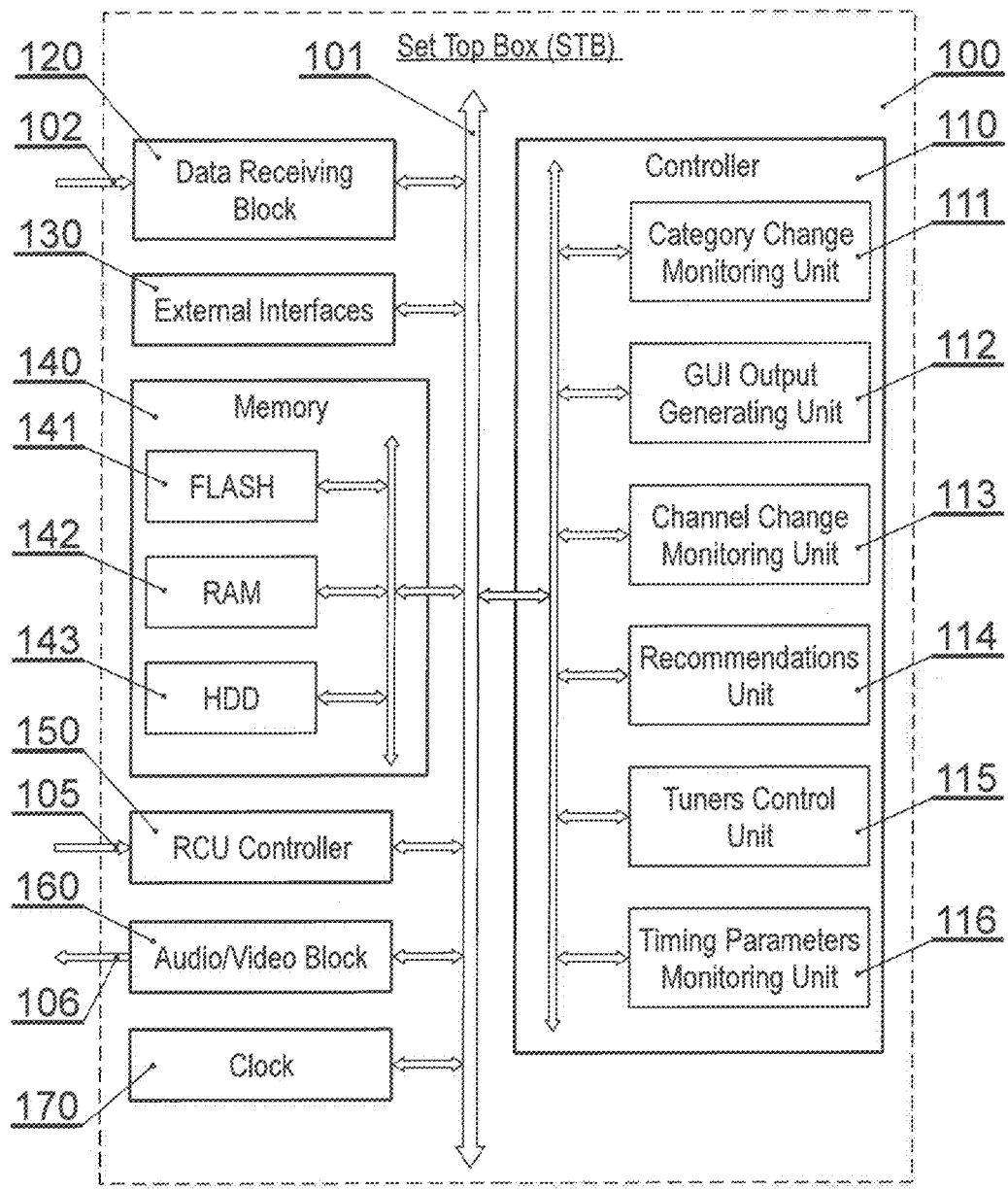
FIG. 1 presents an example of a structure of a Set Top Box (STB)

FIG. 1 presents an example of a structure of a Set Top Box (STB). A controller 110 comprises a plurality of units configured to provide the functionality of the system as described herein in accordance with the method of FIGS. 8-9.

A category change monitoring unit 111 is responsible for detecting a category change command.

A GUI output generating unit 112 is responsible for generating and operating a graphical user interface.

A channel change monitoring unit 113 is responsible for detecting a channel change command.

A recommendations unit 114 is responsible for handling and providing recommendations to a user.

A tuners control unit 115 is responsible for managing an available pool of tuners and appropriate assignments to selected channels. This will become evident in details from the following figures.

A timing parameters monitoring unit 116 is responsible for monitoring timing parameters between successive changes of categories or channels within a category.

The STB 100 operates utilizing memory blocks 140, that may comprise RAM 142 and/or Flash 141 blocks and/or a hard disk drive (HDD) 143 or another type of mass storage that can be used to store video or other data locally at the STB, but is not essential for its operation.

A clock module 170 is configured to provide timing data necessary for cooperation of the device units.

A content receiving block 120 is configured to receive downstream data 102, such as video content, from the broadcasting distribution network. The content receiving block 120 (also called a front-end block) may comprise a plurality of tuners (such as satellite, cable, terrestrial or IPTV tuners), wherein one of the tuners receives content to be displayed at the television screen to which the STB is directly connected (e.g. the STB 100 connected to a TV set) and other tuner(s) receive(s) content to be recorded at the HDD 143 while the remaining tuner(s) may be used for predictive channel tuning.

External interfaces 130, such as the Ethernet interface, are configured to communicate, via at least one transmission channel, with the Ethernet (IP) network or the wireless network, in order to receive applications and/or content recommendation data, as well as to transmit user or STB statistic data.

The STB 100 is operable by the user via a remote control unit (RCU) that communicates, typically via an infrared (IR) receiver receiving an IR signal 105, with a RCU controller block 150.

An audio/video block 160 is an example of a content presentation block and configured to decode the received content, convert it to an audio/video format suitable for presentation to the user, and to transmit the converted content via a transmission channel 106 to the TV set to which the STB is directly connected.

All modules of the STB communicate with each other via one or more internal data buses 101.

Figure 2:
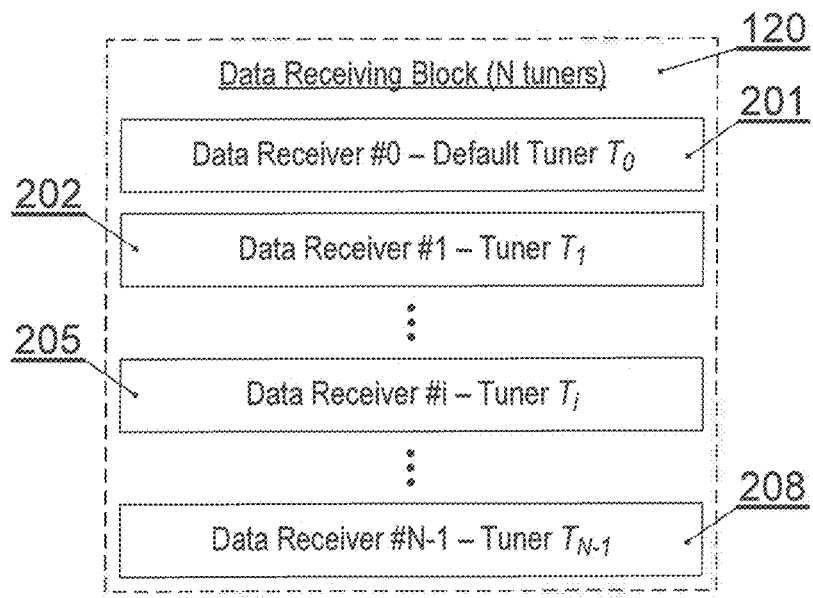
FIG. 2 presents an exemplary pool of available tuners in the data receiving block.

FIG. 2 presents an exemplary pool of available tuners in the content receiving block 120. The pool may comprise N tuners 201-208, for example 8. In such case a real life scenario may be such that one tuner is used for live viewing, two tuners are used for recordings while the remaining five tuners are allocated for predictive channel tuning (considered free tuners).

Figure 3:
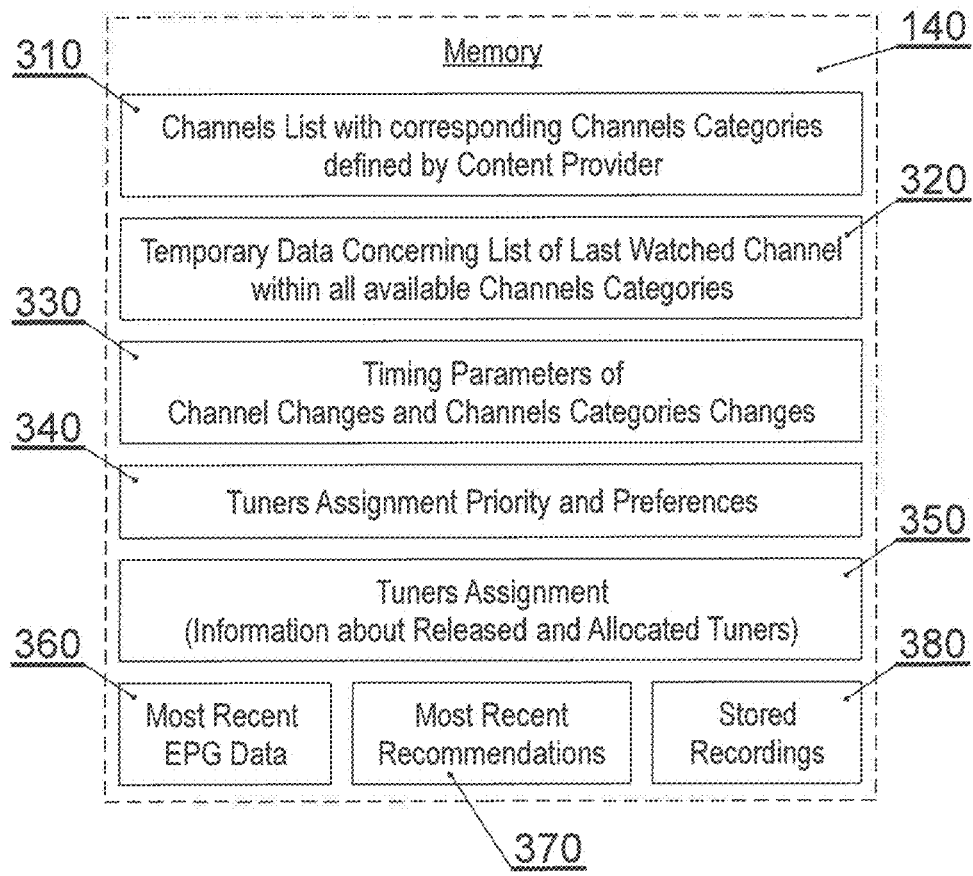
FIG. 3 presents data stored in a memory of the STB.

FIG. 3 presents data stored in the memory 140 of the STB 100. Data is stored in containers, such as tables or other data containers types.

A data set comprises a particular configuration, specifying a plurality of parameter types defined in data containers 310-380. That configuration can be changed by the user of the device or remotely by a system operator.

A channels list, such as television channels, with assigned channel numbers and channel categories which are defined by a content provider are stored in data set 310.

Temporary data concerning a list of last watched channels within all available channels categories is stored in data set 320.

A data set of Timing Parameters of Channel Changes and Channels Categories Changes 330 comprises information concerning last category change time and last channel change time or alternatively a single time indicating last category or channel change, A Tuners Assignment Priority and Preferences data set 340 stores user's preferences regarding assignment of currently unused tuners that may be used in predictive channel(s) change. This configuration will be explained later on with details and further figures.

A Tuners Assignment data set 350 comprises information about released and allocated tuners. In other words this data set defines a pool of available and optionally allocated tuners resources 201-208.

A most recent EPG data set 360 comprises an up to date EPG (Electronic Program Guide) which provides additional data about content available from various sources (such as content delivery network or other content providers).

A most recent recommendations 370 data set comprises information concerning program recommendations based on current location of the user and current content provider as well as recommendations resulting from the user behavior. For example, if the STB is used by a plurality of users, each having a separately accessible user account (with separately tracked watched content or separate access to content over special channels such as VOD), then each user may receive different content recommendations (e.g. related to the favorite type of content for that particular user, for example VOD content recommendations related to user's favorite television series).

A stored recordings data set 380 comprises recordings of the programs.

Figure 4:
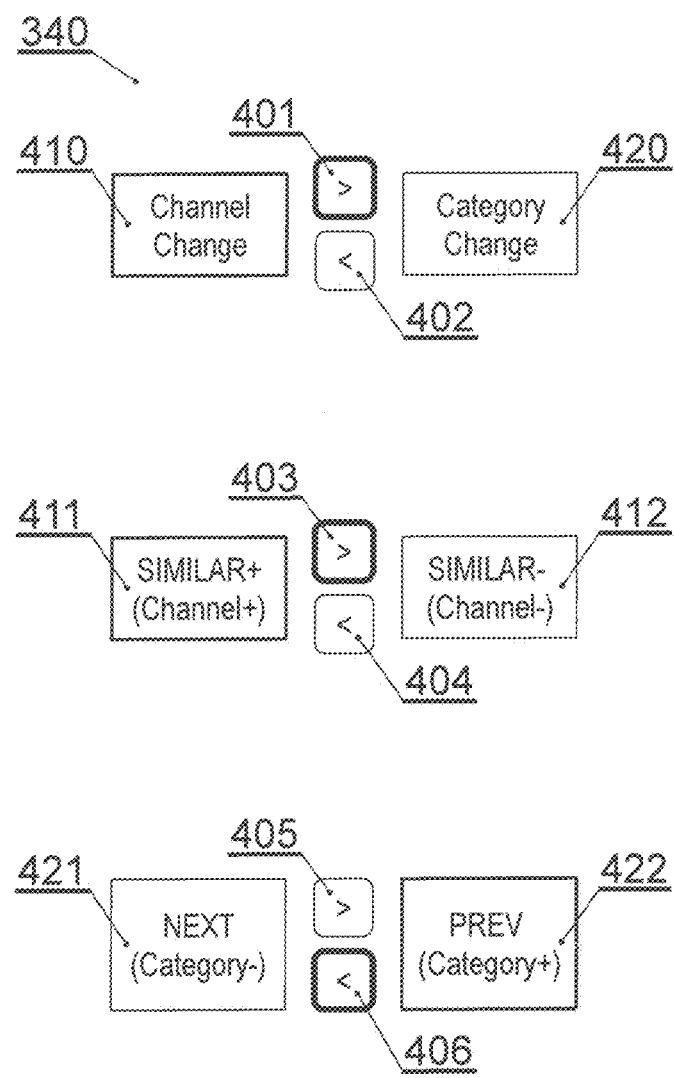
FIG. 4 shows tuners assignment priority and preferences.

FIG. 4 shows tuners assignment priority and preferences 340. In general a pool of free tuners may be assigned, in the background, to predicted channels in order to speed up channel change processes. Such assigned tuner is tuned and receives data but typically the data are not decoded/presented.

A first option may be a preference of channel change 410 over a category change 420 i.e. whether 401-402 to assign first a free tuner to next/previous channel in the selected category or to assign a free tuner to a next/previous category (i.e. typically its last viewed channel).

When preference of channel vs. category has been set, a user may also decide whether in case of channels, a preference 403-404 should be given to the next 411 of previous channel 412 in a given category.

Also, when a preference of channel vs. category has been set, a user may also decide whether, in case of channels within a given category, a preference 405-406 should be given to the next 421 of previous category 422.

Figure 5:
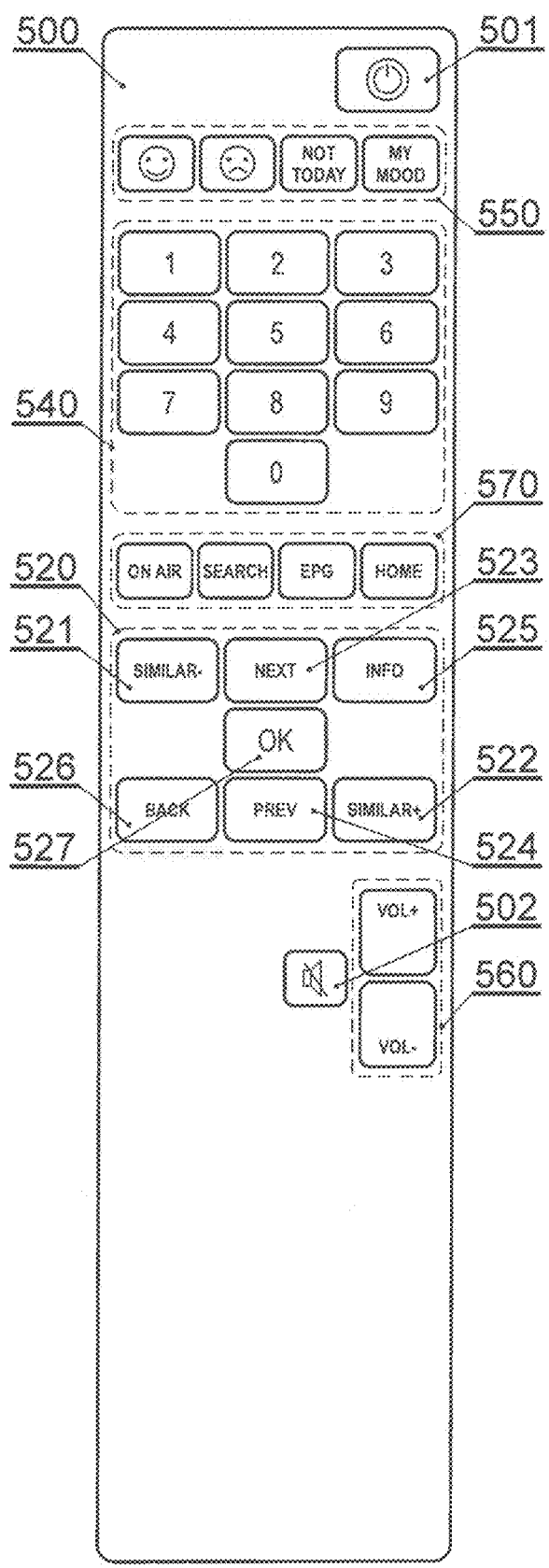
FIG. 5 presents a remote control unit with a dedicated section of buttons.

FIG. 5 presents a remote control unit 500 with a dedicated section 520 of buttons 521-527 for the functionality as described herein.

The SIMILAR− button 521 and the SIMILAR+ button 522 provide a channel zapping function.

The NEXT button 523 and PREV button 524 provide a category zapping function.

The INFO button 525 allows to display additional information concerning the selected category or channel.

The BACK button 526 allows to jump to the previously watched channel.

The OK button 527 functions as a confirmation command, for example when navigating through a home screen of a user device (STB).

A section 560 comprises a volume up and volume down buttons while a button 502 provides a mute option.

A button 501 allows to switch on and off the user device whereas a section 540 comprises a numeric pad buttons.

A section 550 provides buttons for describing current mood of the user, which is determinative for suggested recommendations. For example, the user may declare a sad mood and as a result the system does not recommend fun and entertaining programs but rather serious or neutral contents.

A section 570 provides buttons for selecting a content presentation screen, a search engine or the home screen.

Figure 6:
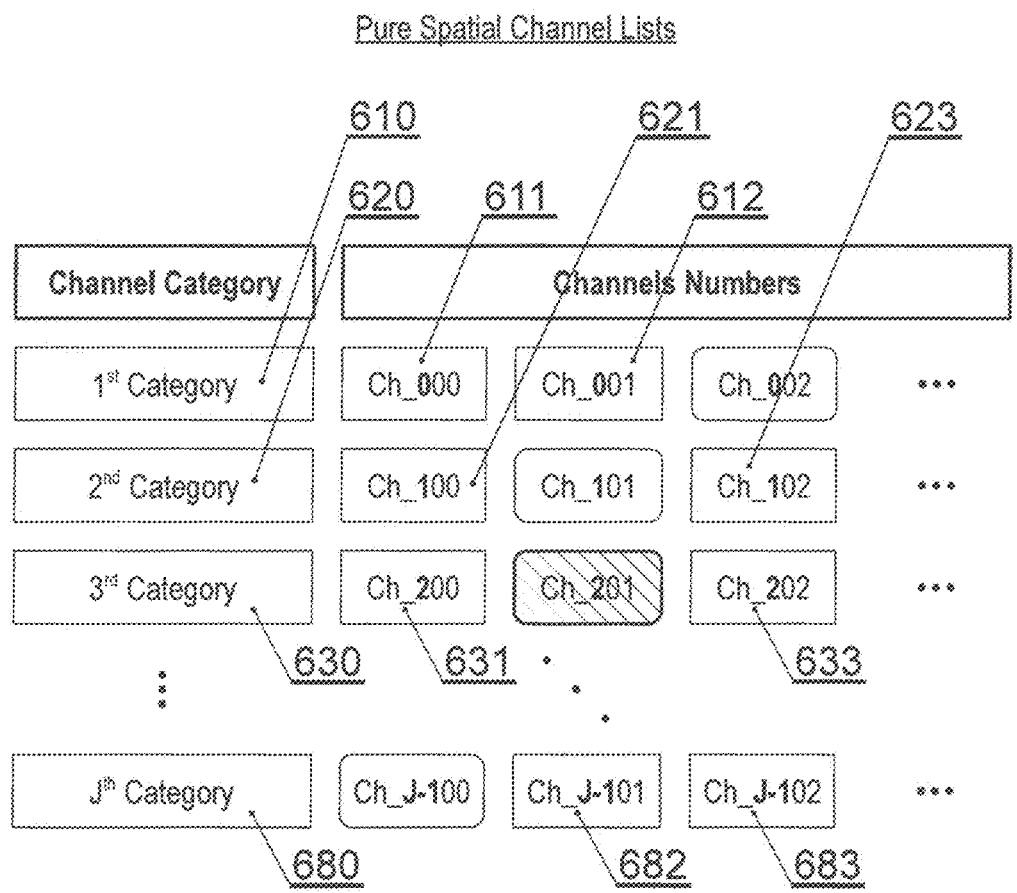
FIG. 6 presents a pure spatial channel list arrangement.
Figure 6:
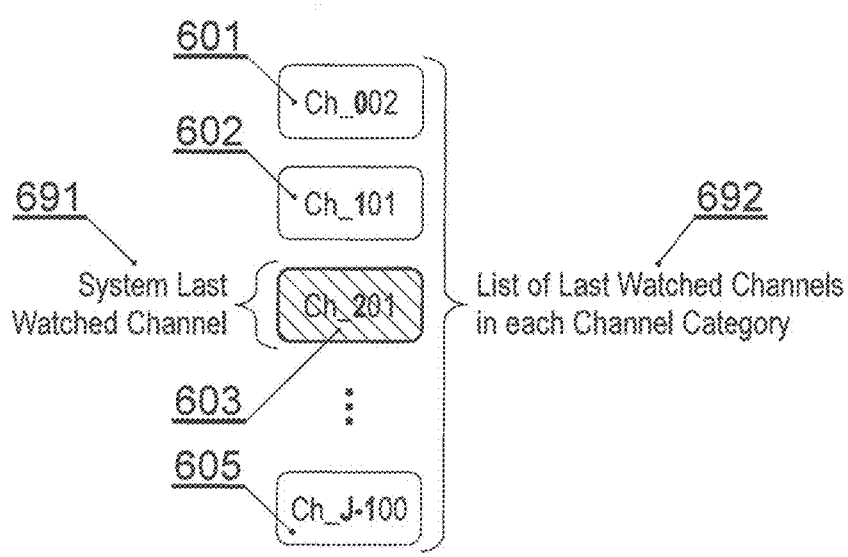

FIG. 6 presents a pure spatial channel list arrangement in which the channels 611-683 are grouped into categories 610-680. The list of categories 610-680 contains a single instance of each category. Each category forms a separate list of consecutively arranged channels. As presented, the $1^{st}$ category 610 comprises channels (611, 612) having consecutive numbers Ch_000, Ch_001, Ch_002. Similarly the $2^{nd}$ category 620 comprises channels (621-623) having consecutive numbers Ch_100, Ch_101, Ch_102. In the pure spatial channel list arrangement the category zapping (navigating) function is provided by the NEXT 523 and PREV 524 buttons.

The SIMILAR+ 522 and SIMILAR− 521 buttons allow zapping through the channels present within the chosen (current) category. During zapping through the channels, the system forms a list 692 of last watched channels 601-605 in each category. Therefore when the user requests the category zapping command by pushing the NEXT or PREV buttons, the system jumps to the last watched channel of the next or previous category. The last watched channel, before the user device is turned off, becomes the system last watched channel 691 which is tuned upon powering on of the device.

Figure 7:
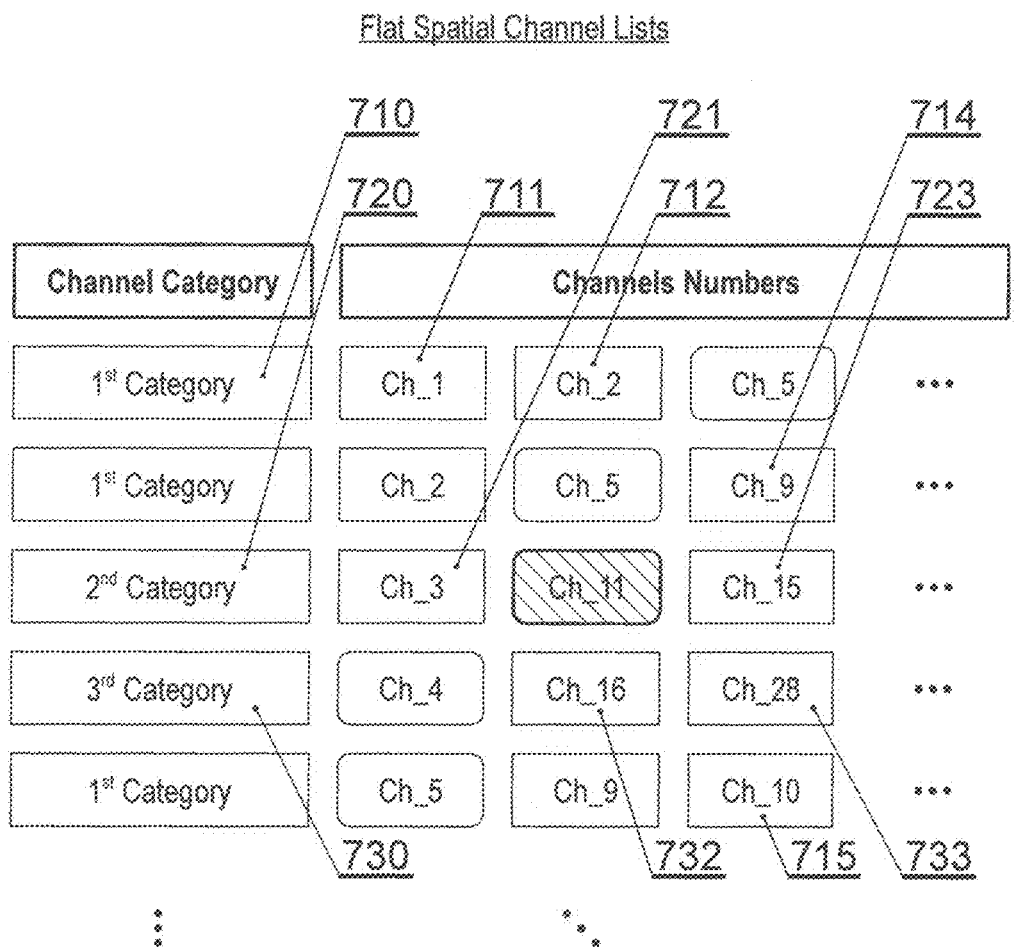
FIG. 7 presents a flat spatial channel list arrangement.
Figure 7:
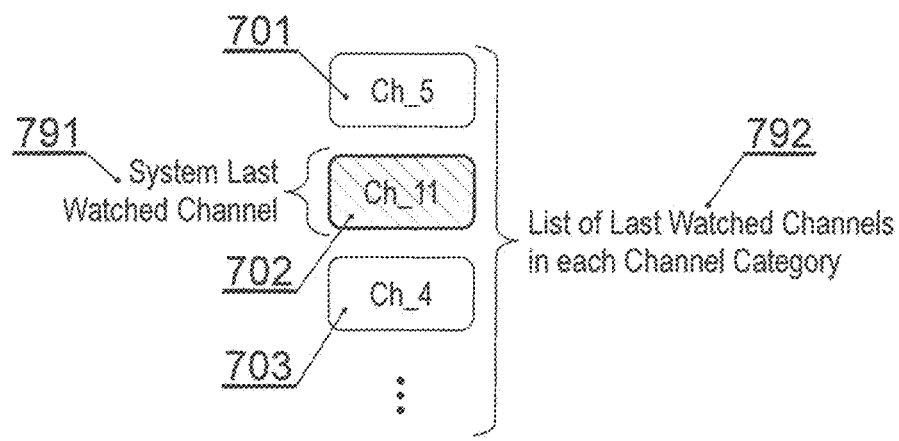

FIG. 7 presents a flat spatial channel list arrangement in which the channels 711-733 are arranged consecutively according to their number as presented in a first column starting with channel Ch_1 711. The order of the channels 711-733 is not dependent on their channel category 710-730. The list of categories 710-730 contains a plurality of entries for at least one category. Therefore, often the neighboring channels belong to different categories, for example Ch_2 belongs to the $1^{st}$ category, Ch_3 belongs to the $2^{nd}$ category while Ch_5 again belongs to the $1^{st}$ category.

As presented, the consecutive categories on the list of categories 710-730 correspond to categories of consecutive channels in the content receiver, therefore the channels belonging to the same channel category do not necessarily have consecutive channel numbers, however they are arranged increasingly according to their channel number.

In the flat channel list arrangement the NEXT 523 and PREV 524 buttons allow zapping through the categories of the channels. However if the chosen channel category (the one the user jumped to) is the same as the last category, then the next or previous channel of the same category is selected (as presented in FIG. 12B in step 1206). The SIMILAR+ 522 and SIMILAR− 521 buttons allow zapping through the channels which belong to the same category. For example, when the user is currently watching Ch_2 channel, pressing the SIMILAR+ button will result in jumping to the Ch_5 channel. During zapping through the channels, the system forms a list 792 of last watched channels 701-703 in each category.

Therefore, when the user requests the category zapping command by pushing the NEXT or PREV buttons, the system jumps to the last watched channel of the next or previous category (unless the chosen category is the same as the last one). The last watched channel, before the user device is turned off, becomes the system last watched channel 791 which is tuned upon powering on of the device.

Figure 8:
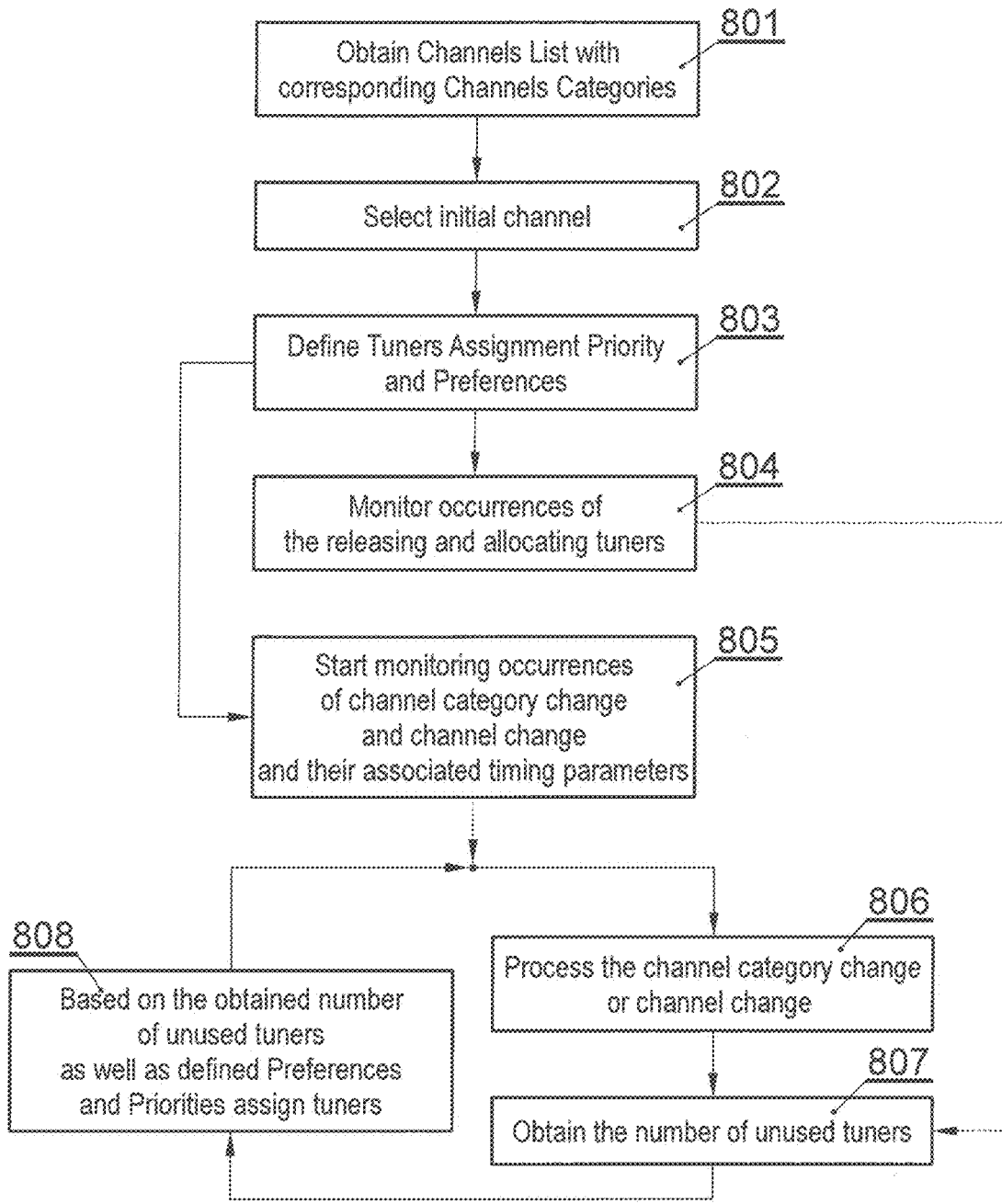
FIG. 8 presents a high level method of application of the present invention.

FIG. 8 presents a high level method of application of the present invention. At step 801 a receiver obtains a channels list with corresponding channels categories. Next, at step 802 there is selected an initial channel to which the receiver will tune (a starting channel).

Subsequently, at step 803 there is executed tuners assignment priority according to applicable preferences and monitoring tuner allocation and release 804 (running in parallel to other tasks). When a change in available tuners list occurs the system executes step 807.

This step 804 is followed by executing 805 a monitoring task (running in parallel to other tasks) that is responsible for monitoring occurrences of the channel category change or channel change and their associated timing parameters. When a change in 805 occurs the system executes step 806.

Subsequently, at step 806, the system processes the channel category change or channel change. This results in setting a new channel as the current live channel and triggers execution of new assignment of available tuners pool. Said new channel may be readily available from the tuners that are tuned in the background to neighboring channels in order to facilitate rapid channel change.

When a current live channel has changed, at step 807, the system obtains a list of currently unused/free tuners (typically tuners that are not used for live signals or recordings) and at step 808 assigns available tuners to selected other channels in order to facilitate rapid channel change based on system's preferences and priorities (e.g. according to FIG. 4).

Figure 9:
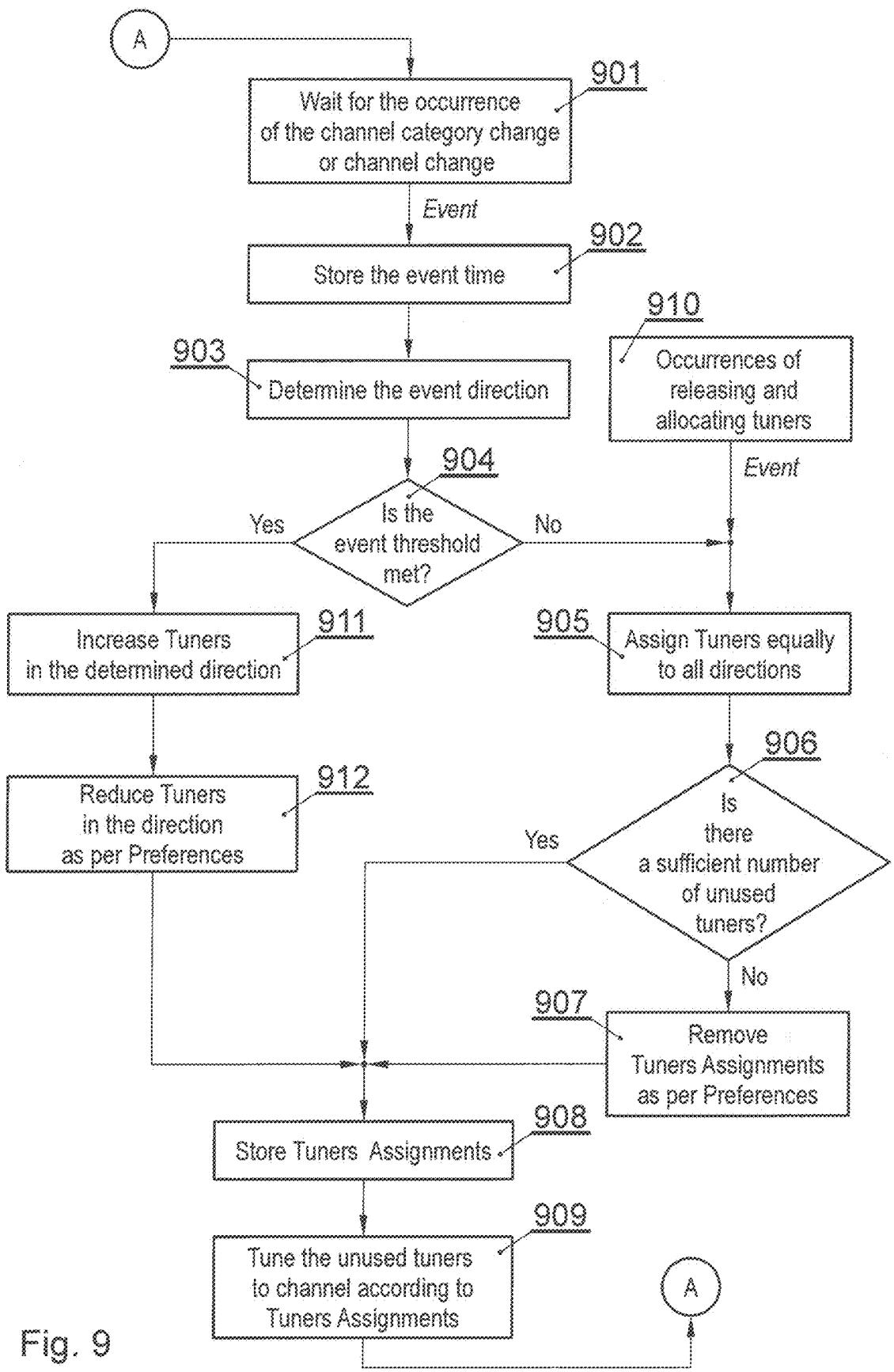
FIG. 9 shows details of unused tuners assignments.

Further details of tuners assignments will become evident from FIG. 9 and its description which presents a process of channel prediction executed in a loop after initial tuning to a live channel (example after power on). Step 901 corresponds to step 805 and when category change (which results in tuning to a given channel of the new category) or channel change within selected category has been selected. Subsequently, at step 902 a time of such event is stored in memory 140.

Next, at step 903 there is determined a direction of the change i.e. a user typically will use "up" for the previous category, "down" for the next category, "left" for the previous channel within a current category and "right" for the next channel within the current category. This is understood as the direction of the change event.

Further, it is verified 904 whether the time of step 902 is within a threshold (for example below 5 seconds) to the previous category or channel change and in case it is not (for example because the time between successive changes is higher than the threshold or the current change is the first change after power on), the process advances to step 905 where the system assigns initially (provisionally) all available tuners to all directions equally. At this step there is not any tuning executed as only the tuners assignment is provisionally considered.

For example, depending on total number of tuners an initial assignment may be assumed where in a system with 4 free tuners one tuner is assigned per each direction or in case of a system with 8 free tuners, two tuners are provisionally assigned per each direction. This assignment will be further modified in the following steps.

Subsequently, at step 906 it is verified whether the provisional assignment of step 905 may be effected using the available number of tuners. If it may, the system moves to step 908 where tuners assignments are stored and effected by tuning said tuners respectively 909 after which the system returns to further iteration (A).

In case the provisional assignment of step 905 may not be effected due to lack of sufficient number of tuners, the method proceeds to step 907 where system preferences (FIG. 4) are used in order to remove tuner assignments from the provisional arrangement. Examples of such removals in view of system preferences, will be presented in FIG. 10. When the provisional tuners assignment has been modified in view of preferences to match the number of unused tuners, the method moves to step 908.

In case the threshold condition of step 904 has been met, this means that successive channel or category changes have been executed rapidly. Next, the method takes the stored tuners assignment (the tuners that are used for predictive tuning) of step 908 and increases the number of tuners in the determined direction 911 while decreasing the number of tuners in the direction 912 identified by the system preferences (FIG. 4).

Finally, the process returns to step 908.

Additionally, the process must monitor occurrences of releasing and allocating tuners 910, executed by other tasks that may have higher priorities than the predictive channels tuning. For example, a user starts a new recording, which will decrease the pool of tuners available for predictive tuning. In such case the assignment steps 905-907 must be re-executed.

Figure 10A:
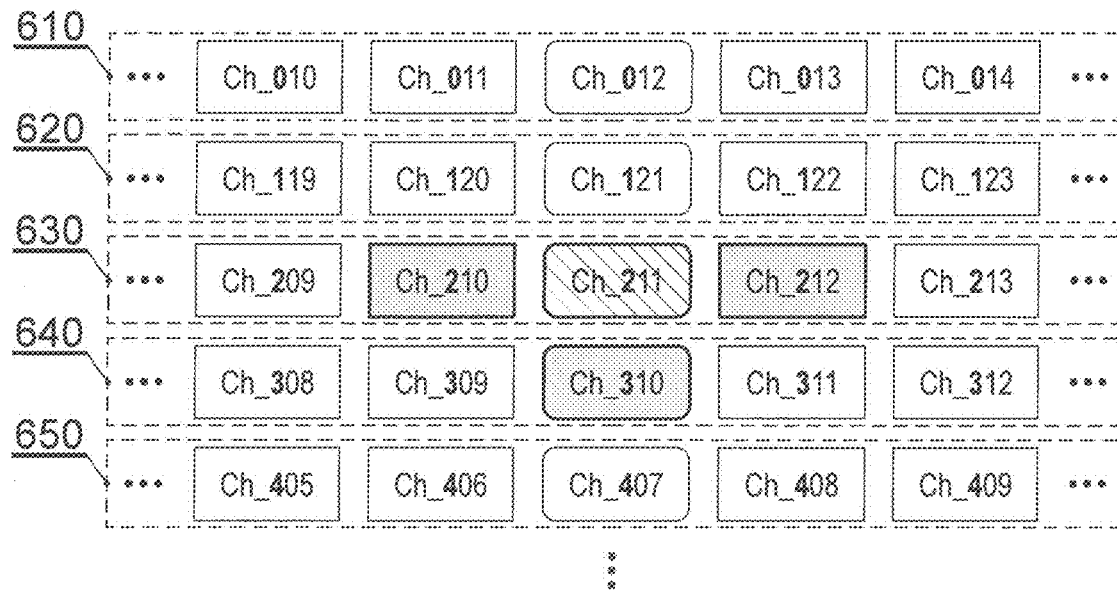
FIGS. 10A-D depict examples of tuners assignments in predictive tuning.

FIG. 10A shows an initial tuners assignment, in a 4-tuner system, when there are three unused tuners that may be assigned to predictive tuning and the system preferences are set according the example of FIG. 4. Channel Ch_211 is the current channel (currently watched channel (live channel)) and the provisional tuners assignment of step 905 is Ch_121, Ch_210, Ch_310 and Ch_212. However, because a channel change is more important 401 than a category change and in category change the next category is more important 406 than the previous category, channel Ch_121 will be removed.

Figure 10B:
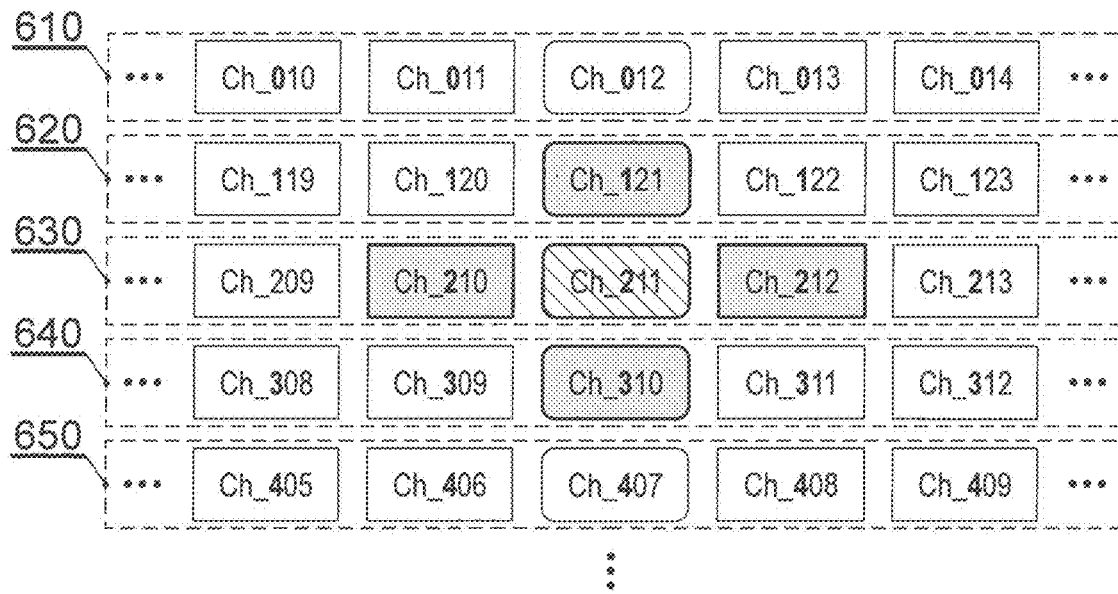

In case one more unused tuner is available than in case of FIG. 10A (4 in total) the Ch_121 will not be removed and a situation of FIG. 10B will occur.

Figure 10C:
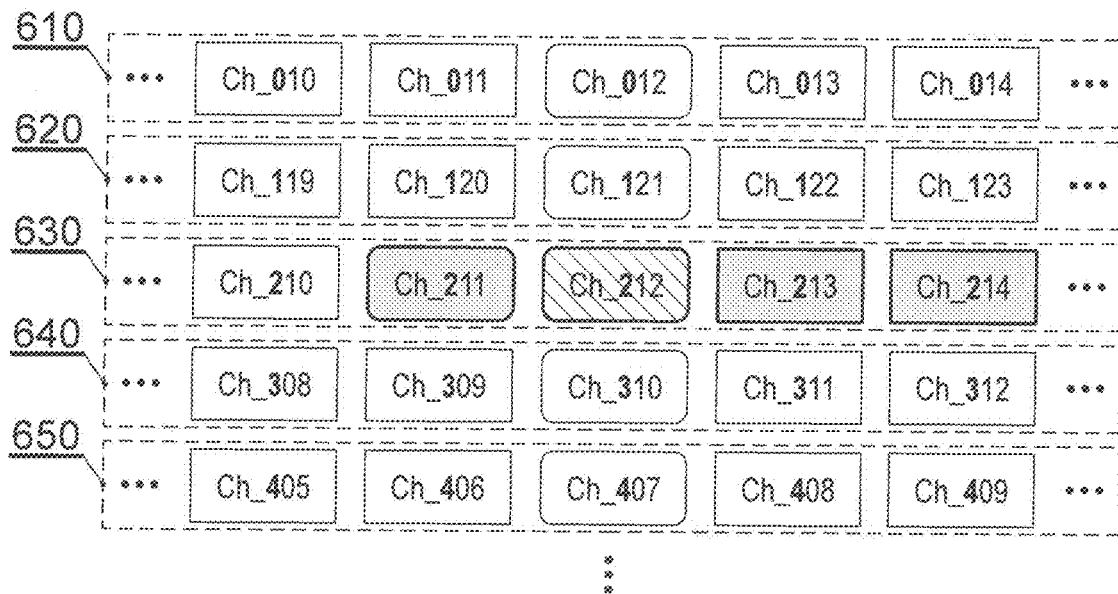

Turning now to FIG. 10C there is a situation of FIG. 10A when a subsequent channel change is rapid (i.e. within said threshold) and its direction is "right". Now Ch_212 becomes the active channel (currently watched channel (live channel)) and because of said rapid change in the "right" direction a count of tuners on the "right" is increased (now 2 tuners for successive channels) and the count of tuners "down" (for the next category) is decreased (now 0 tuners).

This is because, according to current preferences shown in FIG. 4, channels have preference over categories and only one tuner has previously been assigned to categories, therefore it is taken away from this assignment.

When a user has pressed channel change, which is not within said threshold 904, the assignment will return to FIG. 10A provided that the same number of tuners is available for assignment.

Figure 10D:
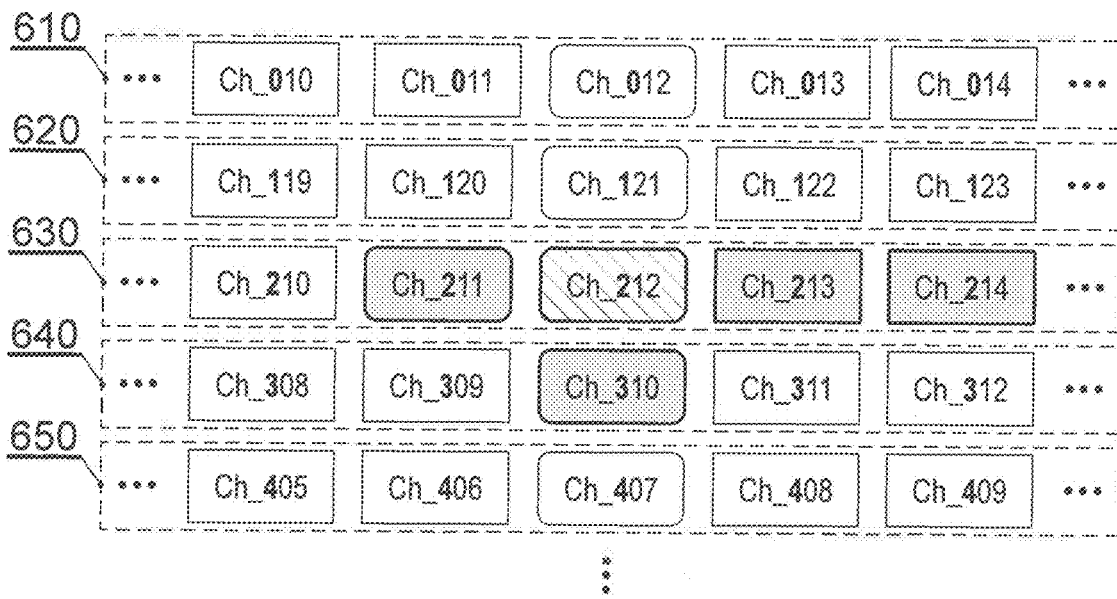

FIG. 10D there is a situation of FIG. 10B when a subsequent channel change is rapid (i.e. within said threshold) and its direction is "right". Now Ch_212 becomes the active channel and because of said rapid change in the "right" direction a count of tuners on the "right" is increased (now 2 tuners for successive channels Ch_213. Ch_214) and the count of tuners "up" (for the previous category) is decreased (now 0 tuners).

This is because, according to current preferences shown in FIG. 4, channels have preference over categories and next category has a preference over the previous category and only one tuner has previously been assigned to the previous category, therefore it is taken away from this assignment.

When a user has requested a channel change, which is not within said threshold 904, the assignment will return to FIG. 10B provided that the same number of tuners is available for assignment.

Figure 11A:
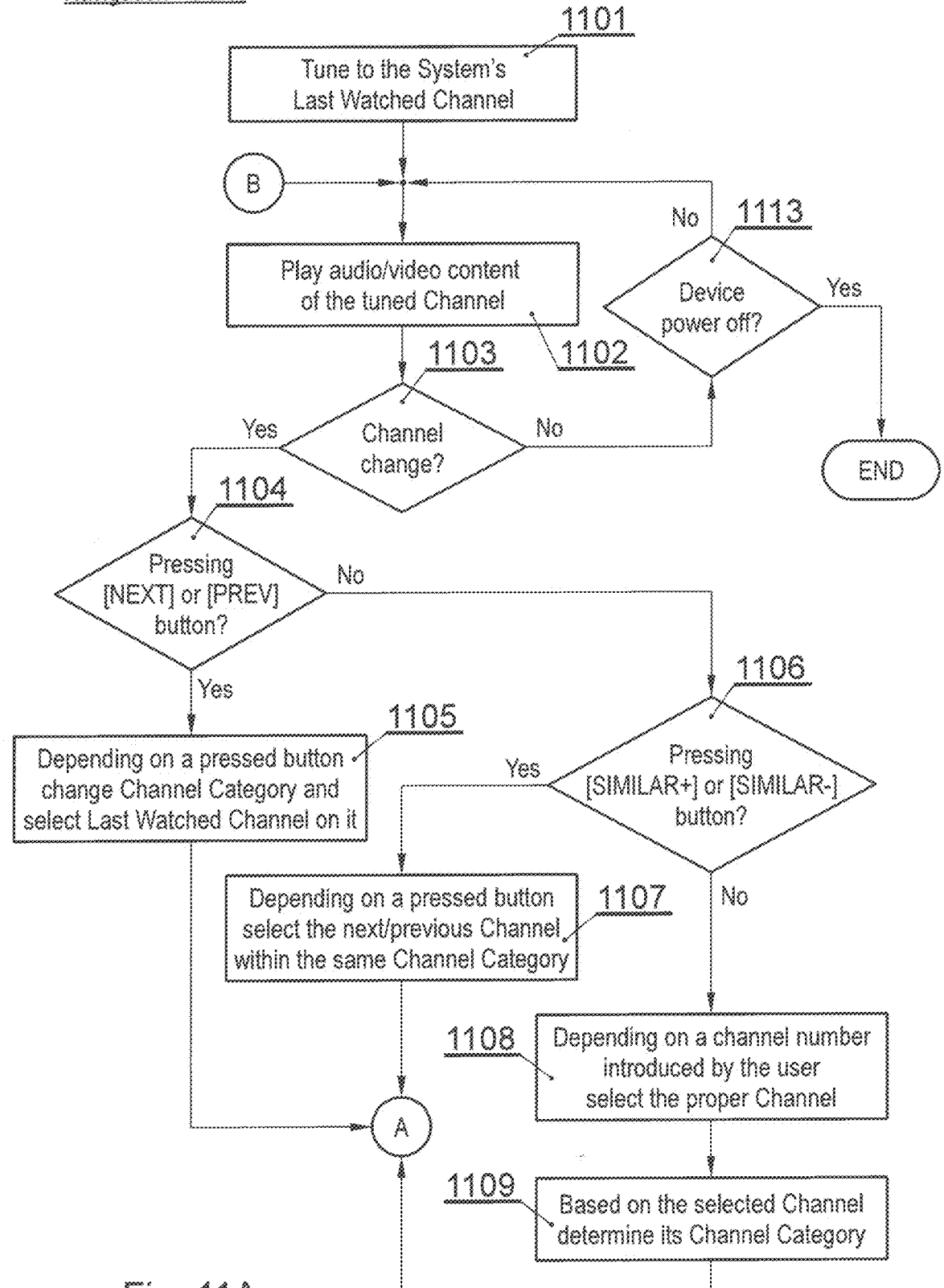
FIGS. 11A-11B present a process of navigating through the pure spatial channel list.
Figure 11B:
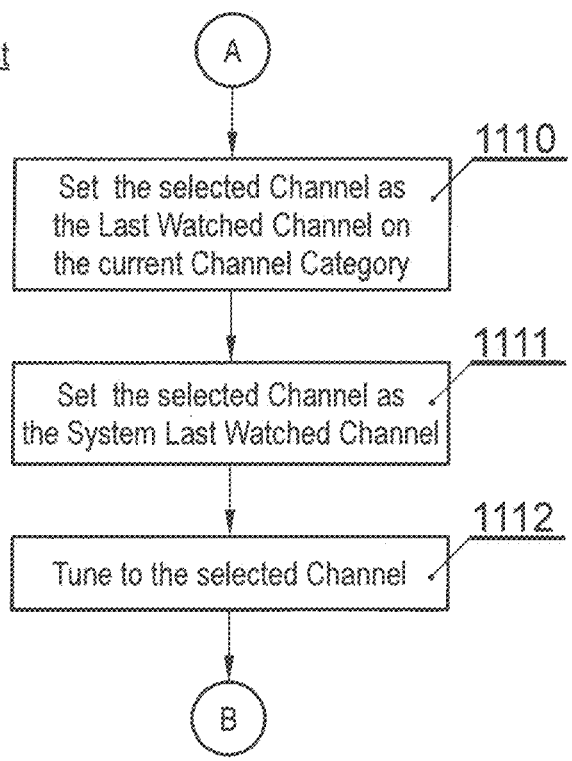

FIGS. 11A-11B present a process of navigating through the pure spatial channel list. First, in step 1101, typically upon powering on, the STB 100 is tuned to the system's last watched channel. Next, at step 1102, an audio/video content of the tuned channel is played (live view channel).

Subsequently, at step 1103, it is checked if a channel change request was invoked by a user. If not, then at step 1113 it is checked if a power off command was invoked for the STB 100, and if so, the procedure terminates. Otherwise, the procedure loops back to step 1102.

If, at step 1103, the channel change request was received, then at step 1104 it is checked whether the category zapping command was requested by pressing the NEXT or PREV button. If yes, then at step 1105 depending on the pressed button, the channel category is changed and the last watched channel within the chosen category is selected.

In Next, at step 1110 the channel number, of the selected channel, is stored as the last watched channel on the current channel category. Next, at step 1111 the channel number of the selected channel is stored as the system's last watched channel. Next in step 1112 the selected channel is tuned and the procedure loops back to step 1102.

If at step 1104, the NEXT or PREV button was not pressed, then at step 1106 it is checked if the channel zapping command was requested by pressing the SIMILAR+ or SIMILAR− button. If yes, then in step 1107, depending on the pressed button, the next or previous channel (within the same channel category) is selected. Next the procedure moves to step 1110. If at step 1106 the SIMILAR+ nor the SIMILAR− button was pressed, then at step 1108 depending on a channel number introduced by the user the proper channel is selected.

Lastly, at step 1100, based on the selected channel, its channel category is determined and the procedure moves to step 1110.

Figure 12A:
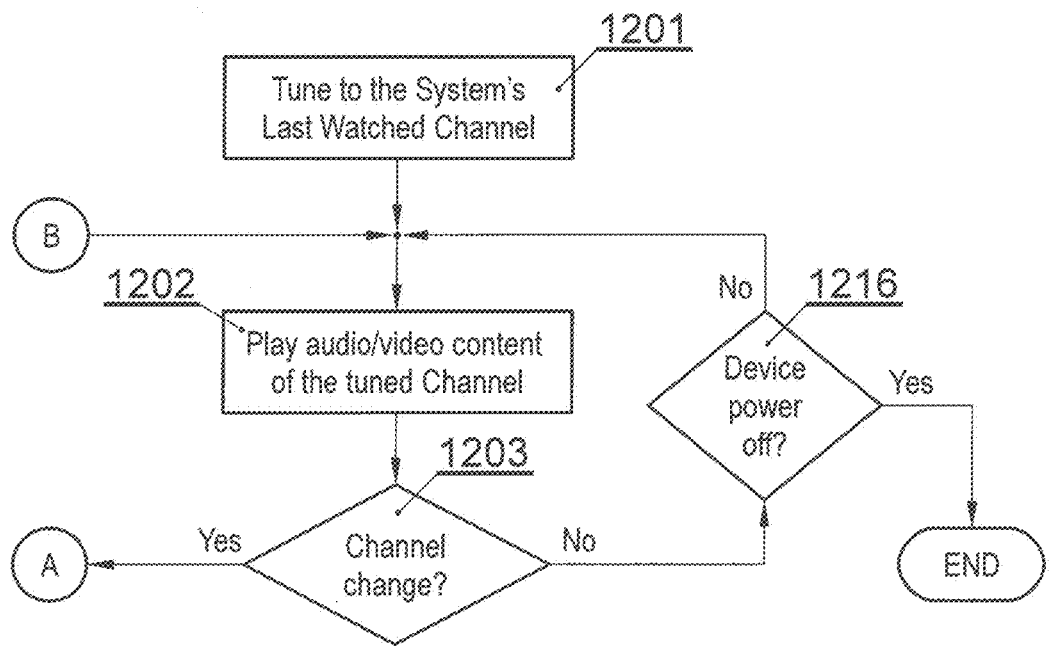
FIGS. 12A-12B present a process of navigating through the flat spatial channel list.
Figure 12B:
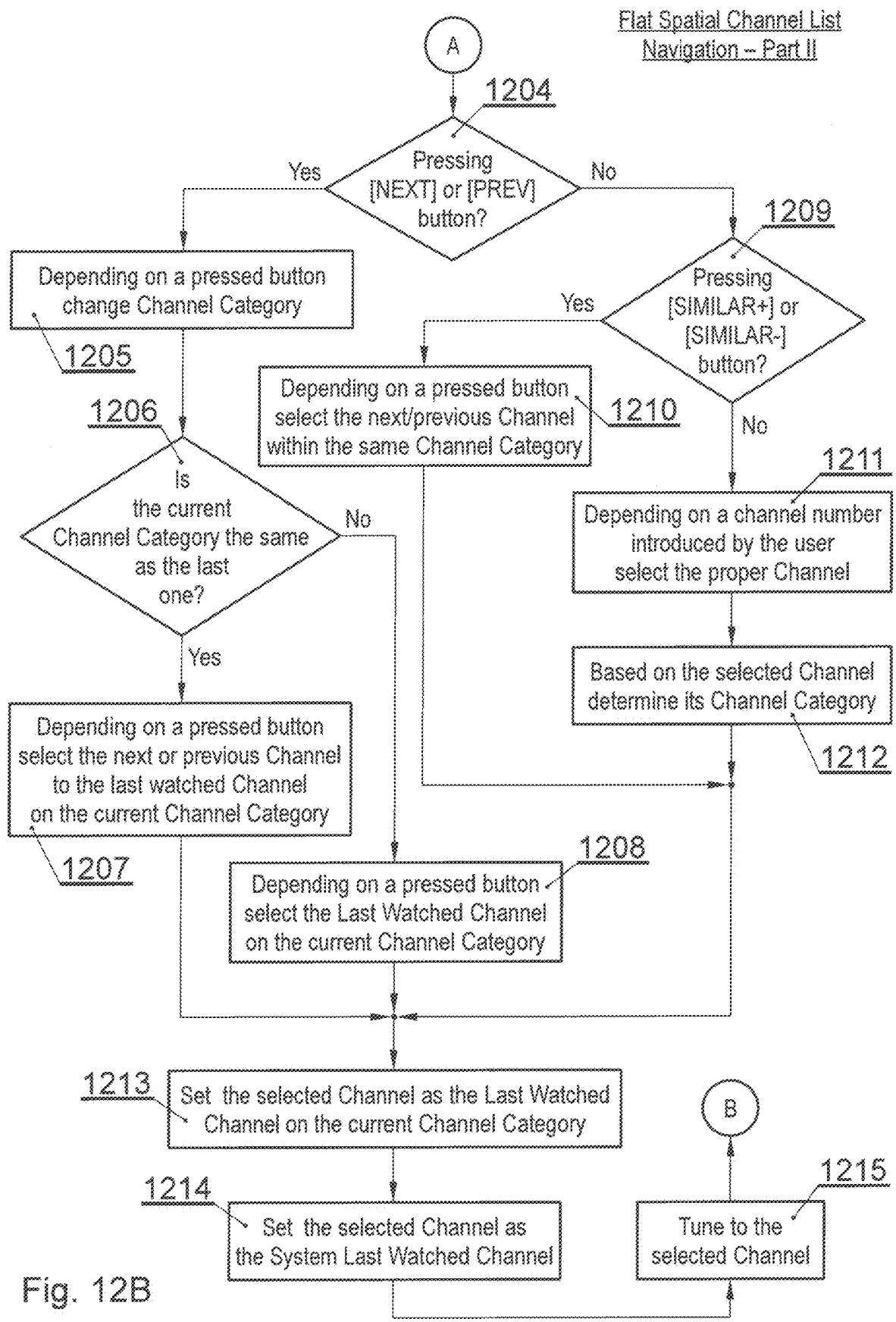

FIGS. 12A-12B presents a process of navigating through the flat spatial channel list. First, at step 1201, typically upon powering on, the STB 100 is tuned to the system's last watched channel. Next, in step 1202 an audio/video content of the tuned channel is played.

Subsequently, at step 1203 it is checked if a channel change request was sent by the user. If not, then in step 1216 it is checked if a power off command was sent for the device, and if so, the procedure terminates. Otherwise, the procedure loops back to step 1202. If at step 1203 the channel change request was received, then at step 1204 it is checked whether the category zapping command was requested by pressing the NEXT or PREV button. If yes, then at step 1205 depending on the pressed button the channel category is changed.

Further, at step 1206 it is checked if the current channel category is the same as the last one. If not, then at step 1208 depending on the pressed button the last watched channel on the current channel category is selected. Next, at step 1213 the channel number, of the selected channel, is stored as the last watched channel on the current channel category.

Next, at step 1214 the channel number of the selected channel is stored as the system last watched channel. Next, at step 1212 the selected channel is tuned and the procedure loops back to step 1202. If at step 1206 the current channel category is the same as the last one, then at step 1207 depending on the pressed button the next or previous channel with respect to the last watched channel is selected on the current channel category and the procedure moves to step 1213.

If at step 1204 the NEXT or PREV button was not pressed, then in step 1209 it is checked if the channel zapping command was requested by pressing the SIMILAR+ or SIMILAR− button. If yes, then at step 1210 depending on the pressed button the next or previous channel within the same channel category is selected. Next the procedure moves to step 1213. If at step 1209 the SIMILAR+ or the SIMILAR− button was not pressed, then at step 1211 depending on a channel number introduced by the user the proper channel is selected. Next, at step 1212 based on the selected channel, its channel category is determined and the procedure moves to step 1213.

In both channel arrangements, the pure spatial and the flat spatial arrangement, the BACK 526 button allows to jump to the previously watched channel whether the channel belongs to the same category or not.

According to the known methods of handling the situation in which the user manually inputs the channel number which is not existing on the list, the system jumps to the nearest existing channel number. Similarly if the user selects to jump to the next channel while watching the last channel in the list of channels, the system loops back to the first channel in the list. Similarly if the user is watching the first channel in the list and selects to jump to the previous channel, then the system loops to the last channel in the list.

The described method provides a more convenient navigating process through the channels in the content receiver (including said predictive tuning), wherein a user can change either the channel category or the channel within the current category without the need of returning or opening the EPG screen with the list of channels.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for navigating through channels in a content receiver may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for channel navigation and predictive tuning in a content receiver having more than one tuner, wherein the channels have assigned channel numbers and categories, the method comprising:
   providing a list of categories;
   providing an ordered list of channels for each category;
   receiving a channel zapping command, selecting a next channel or a previous channel from the list of channels for the current category;
   receiving a category zapping command, selecting a last watched channel in a next category or a previous category from the list of categories and changing the current category to the next category or the previous category;
   storing the channel number of the selected channel as the last watched channel on the current channel category; and
   tuning the content receiver to the selected channel;
   applying a default assignment of free tuners as per system preferences for the purpose of predictive channel tuning;
   executing in a loop, channel prediction comprising the following steps:
   awaiting for a channel category change or channel change request;
   storing a time of the request;
   determining a direction of the request wherein said directions are selected from a group comprising: a next channel, a previous channel, a next category, and a previous category;
   verifying that the stored time is within a threshold to the previous category or channel change and based on the verification:
   reading current predictive channel tuning assignment and increasing the number of tuners in the determined direction while decreasing the number of tuners in the direction identified by the system preferences;
   storing current predictive channel tuning assignment;
   tuning the free tuners to channels according to modified tuners assignment;
   returning to the beginning of said loop,
   wherein the system preferences for the purpose of predictive channel tuning define: a preference of a channel change over a category change; a preference of a next channel over a previous channel; and a preference of a next category over a previous category.

2. The method according to claim 1, wherein the list of categories contains a single instance of each category.

3. The method according to claim 1, wherein the list of categories contains a plurality of entries for at least one category.

4. The method according to claim 3, wherein the consecutive categories on the list of categories correspond to categories of consecutive channels in the content receiver.

5. The method according to claim 4, wherein upon receiving a category zapping command, selecting the next channel or the previous channel with respect to the last watched channel of the current channel category.

6. The method according to claim 1, further comprising, upon receiving a command to tune to a particular channel number, selecting the requested channel and changing the current category to the category of the requested channel.

7. The method according to claim 1, wherein said free tuners are tuners that are other the tuners used for live presented signals or recordings.

8. The method according to claim 1, wherein upon notification that a tuner is released or allocated, applying a default assignment of free tuners as per system preferences for the purpose of predictive channel tuning.

9. A non-transitory computer readable medium storing computer-executable instructions performing all the steps of the computer-implemented method according to claim 1 when executed on a computer.

10. A system for navigating through channels in a content receiver having more than one tuner, the system comprising:
   a content receiving block for providing content of a plurality of programs;
   a controller configured to perform the steps of the method according to claim 1.

11. The system according to claim 10, further comprising a remote control unit with a dedicated section of buttons comprising at least one of: a SIMILAR− button and a SIMILAR+ button configured to select the previous channel or the next channel within the current category; a NEXT button and a PREV button configured to select the next category or the previous category; and a BACK button configured to select the previously watched channel.

* * * * *